No. 659,492. Patented Oct. 9, 1900.
N. C. SCHOUBOE.
APPARATUS FOR CONVEYING OR TRANSPORTING BUILDING OR OTHER MATERIALS.
(Application filed Apr. 17, 1899.)
(No Model.) 4 Sheets—Sheet 1.
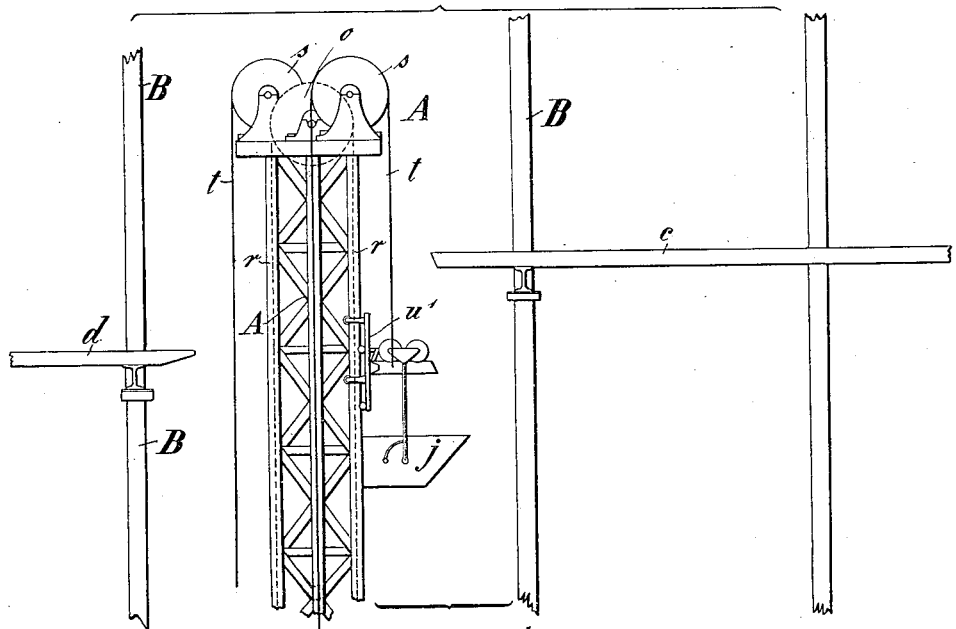
Fig. 1.
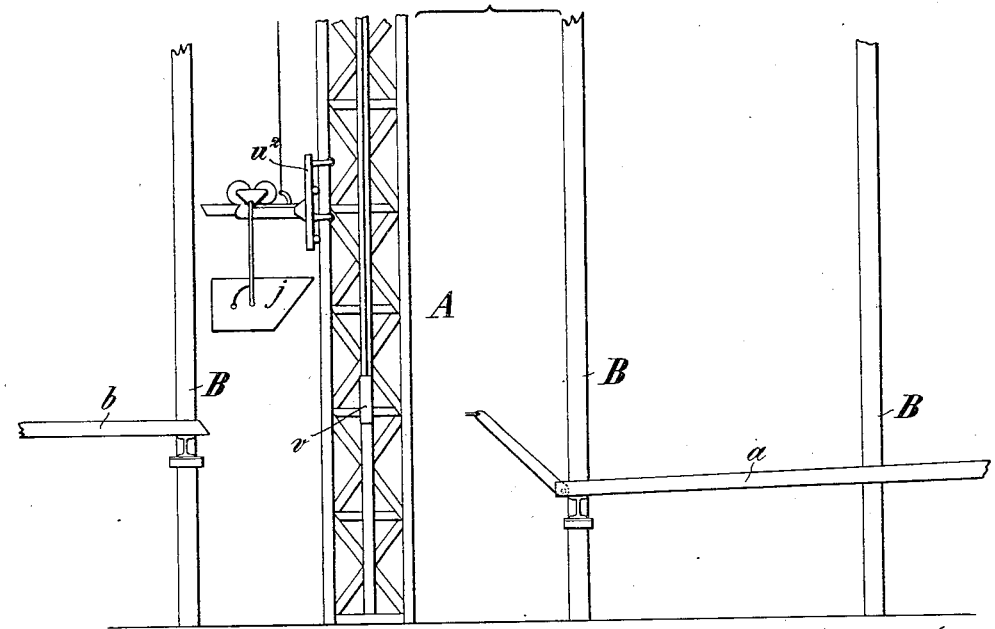
Witnesses:
Inventor
Niels C. Schouboe
By James L. Norris
Atty No. 659,492. Patented Oct. 9, 1900.
N. C. SCHOUBOE.
APPARATUS FOR CONVEYING OR TRANSPORTING BUILDING OR OTHER MATERIALS.
(Application filed Apr. 17, 1899.)
(No Model.) 4 Sheets—Sheet 2.
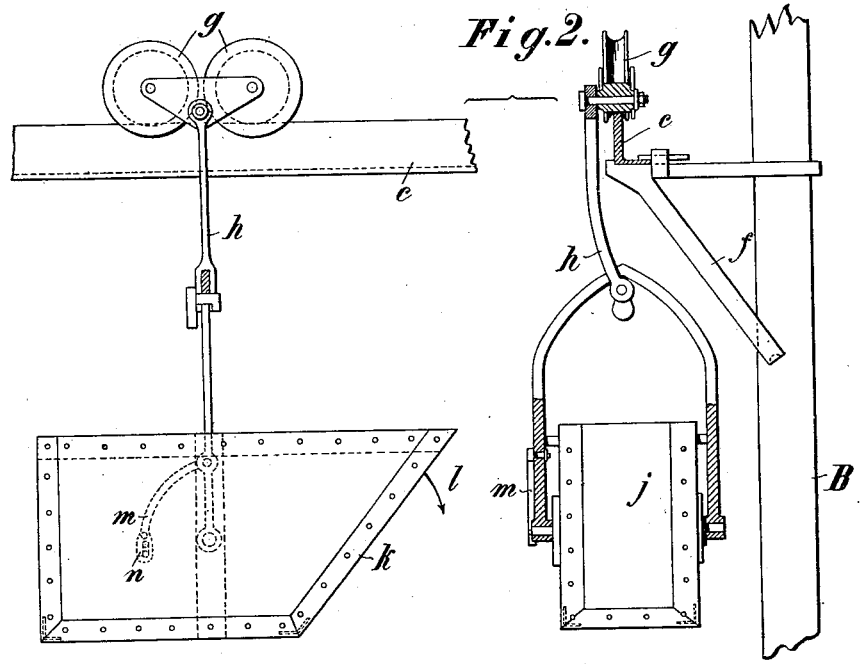
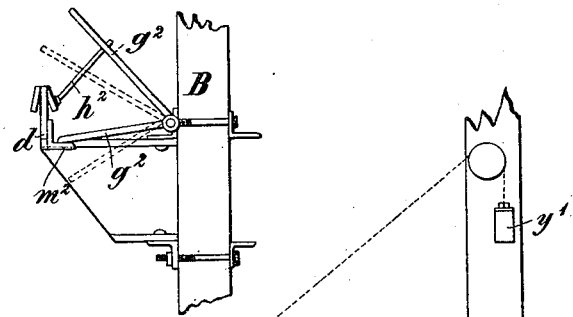
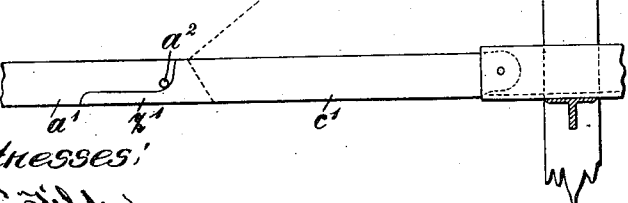
Witnesses:
B. N. Tilden.
H. B. Keefe.
Inventor
Niels C. Schouboe
By James L. Norris
Atty

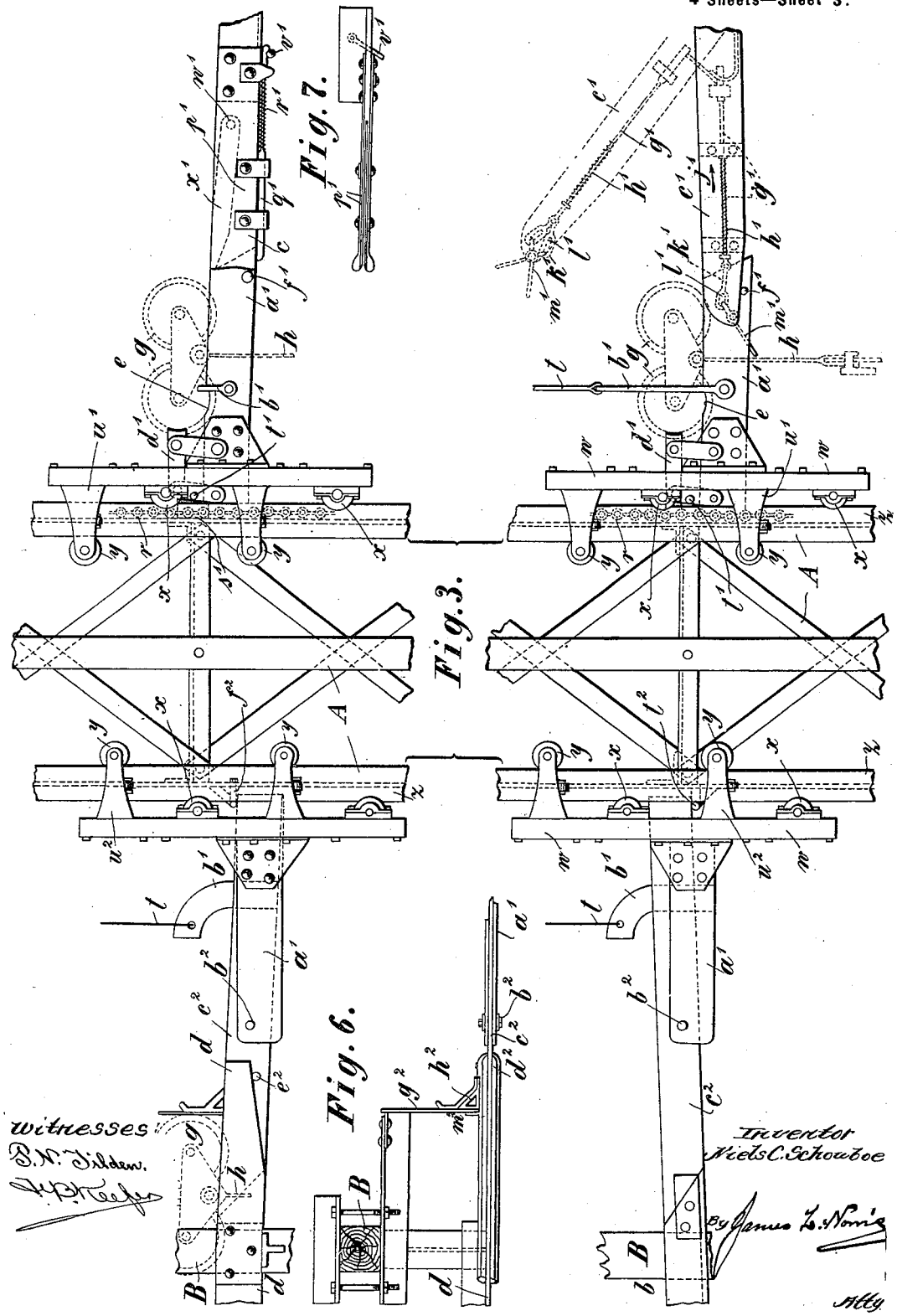

No. 659,492. Patented Oct. 9, 1900.
N. C. SCHOUBOE.
APPARATUS FOR CONVEYING OR TRANSPORTING BUILDING OR OTHER MATERIALS.
(Application filed Apr. 17, 1899.)
(No Model.) 4 Sheets—Sheet 4.
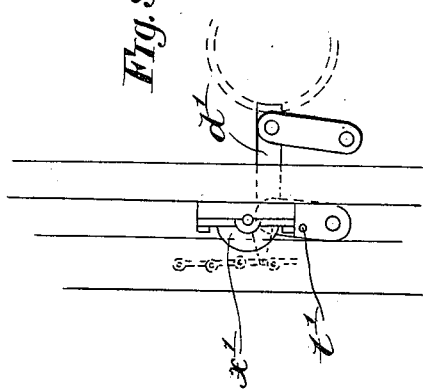
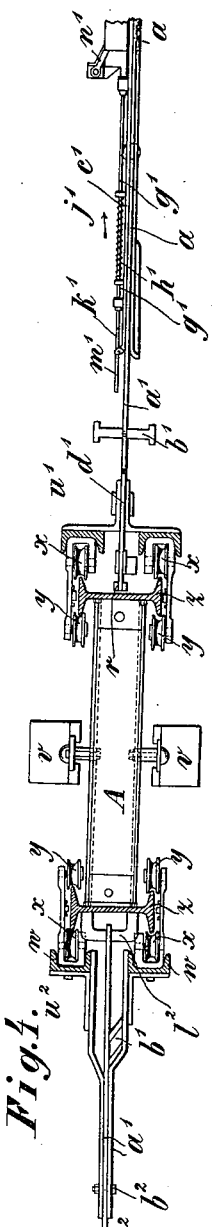
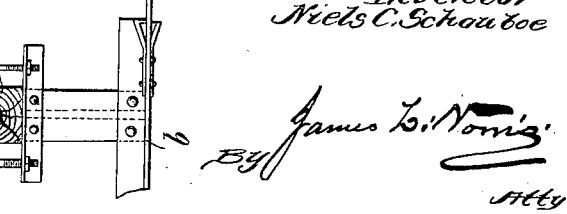
Witnesses:
S. N. Tilden.
Inventor
Niels C. Schouboe
By James L. Norris
Atty

UNITED STATES PATENT OFFICE.

NIELS CHRISTIAN SCHOUBOE, OF COPENHAGEN, DENMARK.

APPARATUS FOR CONVEYING OR TRANSPORTING BUILDING OR OTHER MATERIALS.

SPECIFICATION forming part of Letters Patent No. 659,492, dated October 9, 1900.

Application filed April 17, 1899. Serial No. 713,378. (No model.)

*To all whom it may concern:*

Be it known that I, NIELS CHRISTIAN SCHOUBOE, a subject of the King of Denmark, residing at Copenhagen, in the Kingdom of Denmark, have invented certain new and useful Improvements in Apparatus for Conveying or Transporting Building or other Materials, (for which I have applied for patents in England, No. 4,047, dated February 23, 1899; in Austria dated February 20, 1899; in France, No. 274,170, dated February 25, 1899; in Norway dated February 21, 1899; in Germany dated December 12, 1898, and in Sweden dated December 6, 1898,) of which the following is a specification.

This invention relates to apparatus for conveying or transporting building and other materials which is more particularly designed for hoisting and distributing building materials and which is adapted to work continuously and automatically. In the operation of this apparatus as applied, for example, to the transporting or conveying of building materials the materials to be conveyed are charged into skips, which then run by their own weight on a railway provided on the scaffolding of the building to a hoist, which is driven by suitable motive power and by which the said skips are automatically raised and run along an inclined railway provided on the scaffolding on a level with that portion of the new building which is in progress. During their travel the skips can be stopped and discharged at any desired place or places, according to requirement. After having been discharged the skips are run back to the hoist, by which they are automatically conveyed back again to the lowermost line of rails for the purpose of being charged anew and beginning a fresh journey.

A suitable form of apparatus according to this invention is illustrated by way of example in the accompanying drawings, in which—

Figure 1 illustrates the general arrangement of the apparatus in side elevation. Fig. 2 illustrates a skip with its trolley in side elevation and in front end elevation. Fig. 3 is an elevation showing details of the hoist, with the devices for transferring the skips to the several railways. Fig. 4 is a plan of Fig. 3, showing the arrangement of the lower railway. Fig. 5 is a side elevation of the device for stopping the skips. Figs. 6 and 7 are plan views of detail portions of the parts shown in Fig. 3, showing the arrangement of the upper railway. Fig. 8 illustrates a modification of the device for preventing the trolley of the skip from running off the railway $a$. Fig. 9 is a detail showing the pawl which engages the links of the chain.

The apparatus comprises a hoist proper of ordinary construction, which is driven by a portable engine or any other suitable means, and two or more railways, which are suitably arranged on the scaffolding of the building. In Figs. 1 and 3 two railways $a\,b$ and $c\,d$ are shown arranged on the scaffolding B, one railway $a\,b$ being situated at the foot of the building at a suitable height above the ground while the other railway $c\,d$ is fixed to the scaffolding at any height which is necessitated by the progress of the building operations for the time being. The railway $a\,b$ begins at the hoist A, preferably at the place where the skips are lowered, and it runs in one or more curves alongside the meterials situated at the foot of the building, with a uniform descending gradient back to the foot of the hoist A, where the railway ends at that side of the hoist where the building materials are to be hoisted, so that a trolley placed on the railway and carrying a skip will be able to run over the railway $a\,b$ solely by the action of its own weight. The other railway $c\,d$ is arranged on the scaffolding B on a level with the place where the men are at work, and it runs from that side of the hoist A where the materials are hoisted in one or more curves with a suitable descending gradient past the places where the materials are to be discharged, and thence back to the hoist, where the empty skips are lowered.

The railways $a\,b$ and $c\,d$ may be composed of iron rails of any suitable section—angle-iron, for instance—which are supported on brackets, as shown, that are fixed in a suitable manner to the scaffolding B. As shown, the longitudinal edge of the vertical member of the angle-iron rail $c$ serves as a guide for the trolley, while the member that bears upon the bracket is employed for fixing the rail. The railways may be provided in the usual manner with switches and points in order to allow of the use of a number of railways having all a descending gradient toward the same side and serving to convey the skips to any desired place close to where the materials are to be used by the workmen.

The trolleys $g$, which are adapted to run on wheels on the rails, are similar to the trolleys which are in general use with wire ropeways. The skip $j$ is suspended, by means of a bent arm $h$, from the trolley $g$ in such a manner that the skip $j$ hangs in the central plane of the trolley $g$. The skip $j$ is so constructed and arranged that when loaded it has a constant tendency to rotate in the direction of the arrow $l$ and when empty to assume the position shown in Fig. 2. These tendencies are produced by reason of the inclined end wall $k$ of the skip $j$ and of the position of its point of suspension. The rotation of the skip can be prevented by means of the lever $m$, which is provided at the side of the skip $j$ and which is adapted to be retained by a stop $n$, provided on the skip-body.

The hoist A may be of any suitable kind. As shown, it consists of a framing composed of iron bars of suitable shape in section and provided at top and bottom with chain-pulleys $o$, over which an endless chain $r$, Fig. 3, runs. One of the chain-pulleys is driven by means of a portable engine or other suitable motor. At the top of the framing there are also provided guide-pulleys $s$, over which pass ropes $t$. These ropes are each attached at one end to the respective hoist-carriages $u'$ and $u^2$, while at their other ends they carry counterweights $v$, which are intended to counterbalance approximately the weights of the articles attached to the ropes.

The hoist-carriages $u'$ and $u^2$ are composed of an iron frame $w$, of suitable shape, in section, Fig. 3, provided with wheels $x$ $y$, which roll on the front and rear sides, respectively, of the iron bars of the hoist-framing and are guided thereby in their up-and-down movements.

The hoist-carriages $u'$ and $u^2$ are constructed differently, according to the purpose for which they are intended. The carriages $u'$ are intended for traveling on the ascending side of the hoist, and the carriages $u^2$ are designed for the descending side of the hoist, Fig. 3. On the frame $w$ of the hoist-carriage $u'$ there is mounted a horizontal arm $a'$, which is provided with a shackle $b'$, to which the rope $t$ is attached. The lower railway $a$ $b$ ends at $a$ in a pivoted part $c'$, which is composed of two flat bars and which is capable of turning in a vertical plane. The trolley $g$, with the skip $j$, is adapted to run out upon this pivoted arm $c'$, which is arranged to embrace with its outer end the arm $a'$ of the hoist-carriage $u'$, so that the arm $a'$ is situated between the outer ends of the flat pieces $c'$ when the hoist-carriage is in its lowest position. The trolley, with the skip, can then roll off the railway $a$ onto the arm $a'$. The hoist-carriage $u'$, which is slightly heavier than its counterweight $v$, Figs. 1 and 4, will then automatically assume its lowest position when it is left to itself. The upward movement of the counterweight $v$ is limited in a suitable manner, or the hoist-carriage is made to strike against a suitably-arranged stop. On the hoist-carriage $u'$ there is also provided a pawl $d'$, one end of which is adapted to enter between the links of the chain $r$, when required. The pawl $d'$ is connected to the arm $a'$ of the hoist-carriage $u'$ in such a manner—such as, for instance, by means of parallel bars—that the pawl will always be parallel to the arm $a'$ in its movements.

When a trolley runs onto the arm $a'$ of the hoist-carriage $u'$, the trolley will strike against the pawl $d$ and will press it into the links of the chain, and thus couple the hoist-carriage $u'$ to the chain $r$. In order to prevent the trolley $g$ from running back off the arm $a'$, there is provided in the upper edge of the arm $a'$ a depression $e$, into which one of the wheels of the trolley enters. The pivoted part $c'$ of the railway $a$ rests in its lowest position on a stop $f'$, provided on the arm $a'$ of the hoist-carriage $u'$, and as it moves up with the hoist-carriage $u'$ the movable part $c'$ is rotated and raised into the position shown in dotted lines in Fig. 3, in which position it is held by suitable means until the hoist-carriage $u'$ moves down again. These means comprise a rod $g$, which is capable of moving longitudinally in bearings on the pivoted part $c'$ and which is pressed by a spiral spring $h'$ in the direction indicated by the arrow $j'$. A link $k'$, which is formed at one end with a longitudinal slot $l'$, connects the rod $g'$ with a lever $m'$, one arm of which projects beyond the end of the pivoted part $c'$ and the other arm of which takes in the longitudinal slot $l'$. The other end of the rod $g'$ bears against a pivoted arm $n'$, which is mounted on the fixed part of the railway $a$ at an angle with the latter. As the hoist-carriage $u'$ moves upward and rotates the pivoted part $c'$, as already stated, the stop $f'$ on the arm $a'$ slides first along the lower edge of the pivoted part $c'$ and then against the arm $m'$. The latter then assumes the dotted position, Fig. 3, whereupon the stop $f'$ releases the the arm $m'$; but during the rotation of the pivoted part $c'$ the rod $g'$ has slid along that surface of the arm $n'$ which is facing it, which arm is arranged at an angle to the rod $g'$. When the pivoted part $c'$ assumes the position shown in dotted lines, then the rod $g'$ is raised above the end of the arm $n'$ and will therefore slide automatically over the arm $n'$, whose movement is limited by a stop. The arrangement is such that the angle between the rod $g'$ and the arm $n'$ in this position is ninety degrees. The pivoted part $c'$ will now, after its release by the arm $a'$, have a tendency to return into the horizontal position; but this is prevented by the rod $g'$, which bears with one end upon the end surface of the arm $n'$. When the hoist-carriage $u'$ moves down, the stop $f'$ will strike against the end of the lever $m'$ and will rotate the said lever in such a manner as to move the rod $g'$ in the opposite direction to the arrow $j'$, and thus release the arm $n'$. Consequently the pivoted part $c'$ will fall down. The arrangement is such that at the moment when the rod $g'$ is released the hoist-carriage will have just moved down to such an extent that the pivoted part $c'$ will come to rest upon the stop $f'$. The attainment of this object is also aided by the fact that the hoist-carriage has a certain velocity of fall, whereas the velocity of the pivoted part $c'$ is *nil* at the moment it is released. As soon as the lever $m'$ is no longer acted upon the spring $h'$ will move the rod $g'$ in the direction indicated by the arrow $j'$, so that it will now be situated under the arm $n'$ again. When the hoist-carriage $u'$ arrives at the railway $c$, the arm $a'$ moves in between two fixed plates $p'$, which form an extension of the railway $c$. The beveled front edge of the arm $a'$ pushes back a movable bolt $q'$, which is acted upon by a spring $r'$, that pushes the bolt forward again after the arm $a'$ has passed, so that there is no possibility of the hoist-carriage $u'$ falling down when disconnected from the hoisting-chain. This disconnecting is effected by means of a beveled plate $s'$, which is fixed to the hoist-framing A and which is struck by the top $t'$, that is mounted on a parallel bar of the pawl $d'$. In this manner the pawl $d'$ is pushed back and the trolley $g$ is knocked forward, so that it runs off onto the railway $c$. The trolley $g$, with the skip $j$, then in moving past a pivoted arm $v'$ (which is mounted on the railway and which is in engagement with the bolt $q'$) rotates the said arm $v'$, whereby the bolt $q'$ is drawn back. By this means the hoist-carriage $u'$ is set free and allowed to descend, its descent being retarded by the counterweight $v$. The bolt $q'$ moves back immediately into its operative position.

The disconnecting of the hoist-carriage $u'$ from the chain $r$ is effected when the arm $a'$ is situated slightly higher than the plates $p'$, and the trolley $g$ is set in motion before the carriage is entirely disconnected. For the purpose of providing an inclined plane in this case between the arm $a'$ and the railway $c$ there is arranged between the plates $p'$ an arm $x'$, which is pivoted on a pin $w'$ and whose end engages the beveled part of the arm $a'$ before the latter moves upward. The skip $j$, which now runs on the railway $c$ $d$, is discharged at the required place and then arrives at the hoist-carriage $u^2$ at the railway $d$ for the purpose of being lowered. The hoist-carriage $u^2$ is similar to the carriage $u'$; but the parts necessary for coupling it to the chain $r$ are not provided, because no such coupling takes place. Between the plates which form the arm $a'$ of the carriage $u^2$ there is arranged a lever $c^2$, which is adapted to rotate on a pivot $b^2$ and whose free outer end is situated between two plates $d^2$, that form the termination of the railway $d$ when the hoist-carriage is in its upper position.

The counterweight of the hoist-carriage $u^2$ is somewhat heavier than the latter, but somewhat lighter than the combined weight of the latter and an empty skip. Consequently the hoist-carriage $u^2$ when empty will always be in the upper position. The extent of the upward movement of the hoist-carriage $u^2$ is limited by two steps $e^2$ and $f^2$, which are provided on the outer end of the arm $c^2$ and on the hoist-framing, respectively. A trolley $g$, with a skip coming from the railway $d$ and running out over the plates $d^2$, will run over the lever $c^2$ and onto the plates $a'$, in which position its weight will tip the lever $c^2$ inward. In this manner the trolley $g$ will assume an inclined position toward the hoist-framing, whereby its position during the descent is rendered more secure. When the skip is on the carriage $u^2$, the latter will descend and will be stopped when it arrives at the same level as the railway $b$. When it has reached the bottom, one end of the lever $c^2$ bears against a stop $l^2$ of the hoist-framing, whereby the lever $c^2$ is rotated in such a manner that the trolley $g$, with the empty skip, can roll away from the hoist-framing and onto the railway $b$. As soon as the trolley, with the skip, has left the hoist-carriage $u^2$ the latter is raised by the counterweight $v$ and returns to the top to the railway $d$.

In order to prevent a trolley $g$ from running off the railway $d$ before the hoist-carriage $u^2$ has assumed the top position, a bent lever $g^2$, Figs. 5 and 6, is mounted on the scaffolding B close to the railway $d$. This lever $g^2$ is capable of being rotated in a vertical plane and is arranged in such a manner that one of its arms is situated above the railway $d$, while its other arm is situated below the said railway. The arm which is situated over the railway slides in its rotation along a fixed arm $h^2$, which serves as a support for the same. So long as the upper arm of the lever bears upon the railway $d$ the trolley is prevented from running off the said railway; but the arm $c^2$ of the hoist-carriage $u^2$ is provided with a stop $m^2$, which when the hoist-carriage assumes the top position acts upon the lower arm of the lever $g^2$ and rotates the latter in such a manner that the upper arm is raised off the railway $d$, and the trolley, with the skip, can run freely off the railway $d$ onto the carriage. When the hoist-carriage is being lowered, the bent lever $g^2$ falls down by its own weight and bars all passage over the railway $d$. The empty skips are filled with the materials lying at the foot of the building, and when left to themselves they are conveyed to the place of working, where they are discharged, and they are then run back to the charging-place.

A modification of the arrangement for preventing a trolley on the railway $a$ from running out or to the pivoted part $c'$ while the hoist-carriage $u'$ is ascending is illustrated in Fig. 8. The pivoted part $c'$ is formed with a nose $z'$ and is balanced by a counterweight $y'$ in such a manner that the part $c'$ can be set in any suitable inclined position. The nose $z'$ bears against a stop $a^2$ on the arm $a'$. Consequently the pivoted part $c'$ is correspondingly rotated on its pivot by the arm $a'$ in its ascent and descent.

This apparatus may be also employed for other purposes—such as, for instance, conveying grain, coal, and the like.

What I claim, and desire to secure by Letters Patent of the United States, is—

1. Automatic and continuously-operating apparatus for transporting or conveying building and other materials, comprising in combination, a continuously-operating hoist of the endless-chain type, a lower railway running with a descending gradient from the descending side of the hoist past the charging-places and back to the ascending side of the hoist, an upper railway running with a descending gradient from the ascending side of the hoist past the discharging-places and back to the descending side of the hoist, skips (or the like) adapted to run on said upper and lower railways and hoist-carriages adapted to receive said skips and to be coupled to and uncoupled from the chain of the hoist as required, substantially as described.

2. The combination of a continuously-operating hoist, a lower railway running with a descending gradient, an upper railway running with a descending gradient from the ascending side of the hoist past the discharging-places and back to the descending side of the hoist, skips adapted to run on the upper and lower railways, hoist-carriages, means for coupling the filled skips to the ascending hoist-carriages, means for preventing the hoist-carriage from falling back, means for uncoupling the hoist-carriage from the hoisting-chain, and means for returning the skips to the starting-point, as set forth.

3. In conveying or transporting apparatus of the character described, the combination of a lower railway, an upper railway running with a descending gradient from the ascending side of the hoist past the discharging-places and back to the descending side of the hoist, hoist-carriages, and means for counterbalancing the same so that the carriage which effects the hoisting of the filled skips, has, when empty, a tendency to fall, while the carriage disposed diametrically opposite thereto has a tendency to descend when loaded with the empty skip.

4. In conveying or transporting apparatus of the kind specified, the combination of the railway $a$, a rotary arm thereon, a pivoted arm $c'$, a spring-pressed rod $g'$ arranged on the pivoted part $c'$ and resting with one end upon the rotary arm $n'$ provided on the railway $a$, a slotted link $k'$ connected to the other end of the rod $g'$ and a pivoted lever $m'$ engaging with one end in the slot in the link $k'$ the free arm of said lever $m'$ being adapted to be rotated by a stop $f'$ on the hoist-carriage $u'$ according to the direction of the motion of the latter, for the purpose of causing the pivoted part $c'$ either to remain in its raised position or to move down into its normal position where it is locked.

5. In conveying or transporting apparatus of the kind specified, the combination of the trolley, the skip, a pawl $d'$, the carrying-arm $a'$ having a depression $e'$ into which a wheel of the hoisted trolley enters after the pawl $d'$ has been moved, for the purpose of securing the trolley with the skip in this position from running off.

6. In conveying or transporting apparatus of the kind specified, the combination of a hoist-carriage $u^2$, the railway, a stop on the hoisting-frame, and a lever rotatably mounted on the hoist-carriage $u^2$ for limiting the upward movement of the hoist-carriage $u^2$, and a stop $e^2$ provided on the arm of the lever $c^2$, adapted to engage one end of the railway, while the other arm of the lever $c^2$ bears against a stop $f^2$ on the hoist-framing and thus form a connecting-track from the railway to the hoist-carriage.

7. In conveying or transporting apparatus of the kind hereinbefore referred to, the combination with the railway $d$ and the hoist-carriage $u^2$, of mechanism for preventing the trolley from prematurely running off the railway $d$, comprising a bent lever $g^2$ one arm of which is situated across the railway $d$ so as to bar the same when the hoist-carriage $u^2$ has not yet attained the level of the said railway, but which is automatically raised by the hoist-carriage $u^2$ to open or unbar the railway $d$ when the hoist-carriage $u^2$ has reached the level of the said railway.

8. In conveying or transporting apparatus of the kind specified, the combination of the railway $c$ a railway $a$, having pivoted arm $c'$, the hoist carriage $u'$, its arm $a'$, and a lever $x'$ providing an inclined plane between the arm $a'$ and the railway $c$ and adapted to be rotated on the passage of the hoist-carriage $u'$ and then form an inclined plane or track between the arm $a'$ of the hoist-carriage $u'$ and the railway $c$, which allows the trolley to run safely and with acceleration onto the railway $c$.

9. In conveying or transporting apparatus of the kind described, the combination of a lower railway running with a descending gradient from the descending side of a hoist and back to the ascending side thereof, and an upper railway running with a descending gradient from the ascending side of the hoist to discharging-places and back to the descending side of the hoist, as and for the purpose set forth.

10. The combination of a continuously-operating hoist, an upper railway running with a descending gradient from the ascending side of the hoist past the discharging-places and back to the descending side of the hoist, and a lower railway running with a descending gradient from the descending side of the hoist and past the discharging-places and back to the ascending side of the hoist, as set forth.

In testimony whereof I have hereunto set my hand in the presence of two witnesses.

NIELS CHRISTIAN SCHOUBOE.

Witnesses:
　WOLDEMAR HAUPT,
　HENRY HASPER.